United States Patent
Okumura et al.

(10) Patent No.: US 9,197,107 B2
(45) Date of Patent: Nov. 24, 2015

(54) STATOR, METHOD FOR MANUFACTURING STATOR, AND FLAT CONDUCTOR FOR WINDING

(75) Inventors: Keita Okumura, Toyota (JP); Hirotaka Kawaura, Toyota (JP); Akihiro Iwasa, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 237 days.

(21) Appl. No.: 14/009,970

(22) PCT Filed: Apr. 5, 2011

(86) PCT No.: PCT/JP2011/058603
§ 371 (c)(1),
(2), (4) Date: Oct. 4, 2013

(87) PCT Pub. No.: WO2012/137302
PCT Pub. Date: Oct. 11, 2012

(65) Prior Publication Data
US 2014/0015368 A1    Jan. 16, 2014

(51) Int. Cl.
| H02K 27/02 | (2006.01) |
| H02K 3/12 | (2006.01) |
| H02K 3/18 | (2006.01) |
| H02K 15/04 | (2006.01) |
| H02K 1/14 | (2006.01) |

(52) U.S. Cl.
CPC .. *H02K 3/12* (2013.01); *H02K 3/18* (2013.01); *H02K 15/045* (2013.01); *H02K 1/148* (2013.01); *H02K 2203/12* (2013.01)

(58) Field of Classification Search
CPC .............. H02K 3/12; H02K 3/18; H02K 3/28
USPC ...................... 310/201, 208; 29/596
See application file for complete search history.

(56) References Cited

U.S. PATENT DOCUMENTS

| 6,137,201 A * | 10/2000 | Umeda et al. ................. 310/179 |
| 6,404,092 B1 * | 6/2002 | Baumann et al. ............. 310/201 |
| 8,354,769 B2 * | 1/2013 | Naganawa et al. .... 310/216.077 |
| 2009/0072653 A1 * | 3/2009 | Harada et al. ................. 310/208 |
| 2010/0000624 A1 | 1/2010 | Matsushita et al. |
| 2011/0057537 A1 | 3/2011 | Matsushita et al. |
| 2012/0086298 A1 * | 4/2012 | Fubuki et al. ................. 310/208 |
| 2013/0214623 A1 * | 8/2013 | Yang et al. ....................... 310/46 |

FOREIGN PATENT DOCUMENTS

| JP | 54-066404 | 5/1979 |
| JP | 62-004852 U | 1/1987 |
| JP | 2003-018779 A | 1/2003 |
| JP | 2005-204422 A | 7/2005 |
| JP | 2007-135326 A | 5/2007 |
| JP | 2007-227241 A | 9/2007 |
| JP | 2008-043026 A | 2/2008 |
| JP | 2008-228435 A | 9/2008 |
| JP | 2008-278681 A | 11/2008 |
| JP | 2009-283591 A | 12/2009 |

* cited by examiner

*Primary Examiner* — Hanh Nguyen
(74) *Attorney, Agent, or Firm* — Kenyon & Kenyon LLP

(57) ABSTRACT

A stator includes: a stator core having a plurality of slots and teeth parts; and coils each formed by winding a flat conductor and disposed in the slots. Of the corners of the rectangular cross-section of the flat conductor, a first corner located on the inner circumference side of the coil when the flat conductor is wound to form the coil is provided with a round chamfer having a radius larger than that of another corner. When the coil is inserted into the slots of stator core elements, the rectangular cross-section of the coil is disposed such that the first corner faces toward the outer circumference side of the stator.

7 Claims, 11 Drawing Sheets

STATOR, METHOD FOR MANUFACTURING STATOR, AND FLAT CONDUCTOR FOR WINDING

CROSS REFERENCE TO RELATED APPLICATION

This is a national phase application based on the PCT International Patent Application No. PCT/JP2011/058603 filed on Apr. 5, 2011, the entire contents of which are incorporated herein by reference.

TECHNICAL FIELD

The present invention relates to manufacture of a stator and more particularly to a technique of newly devising the shape of coils in order to increase a lamination factor in slots of the stator.

BACKGROUND ART

In recent years, motors are increasingly demanded to be used for drive power of vehicles. Such motors used for drive power of vehicles are requested to reduce size and increase power. As one method for such a purpose, a method using a flat conductor for a coil has been studied. This is because the use of the flat conductor for a coil allows an increase in cross sectional area and improvement in lamination factor. In the case of a motor using a coil, it is necessary to insert the coil in slots of a stator. However, in many cases, slots have a trapezoidal shape. From the geometrical viewpoint, a rectangular cross section enables a lower void ratio than a circular cross section. This tendency more remarkably appears as the cross sectional area is larger. Accordingly, a flat conductor having a rectangular cross section can provide a wider cross sectional area, which is likely to increase the lamination factor.

Patent Document 1 discloses a technique related to a rotary electric machine for a vehicle. In a stator core formed of stacked electromagnetic steel plates, four corners of each slot are made in circular arc shape and a coil inserted in each slot is formed in rounded or curved shape in correspondence with the circular arc shape of each slot. Of the coils inserted in the slots, accordingly, flat conductor parts on an outermost circumference and an innermost circumference are deformed correspondingly. This results in an increase in lamination factor of a stator and an increased contact area between the stator core and each coil. Thus, an efficiency of heat transfer can be enhanced.

Patent Document 2 discloses a technique related to a method for producing a coil. A coil wire is wound around a bobbin, and then the bobbin is expanded to widen the inner diameter of the coil and external force is imparted from outside to the coil by use of a die or the like, so that a flat conductor forming the coil is plastically deformed to bring the wires into close contact with each other. Thereafter, the coil is subjected to an insulation treatment and inserted in the stator core. This can increase the lamination factor.

Patent Document 3 discloses a technique related to a method for producing an armature. A core of the armature is constituted so that a plurality of coils are arranged circumferentially. On opposite side surfaces on a coil side, an electric wire is wound to form a coil around a teeth part having surfaces almost parallel to a coil side boundary surface and steps nearly equal to the integral multiple of the average thickness of the layers or turns of the coil. As a result, the coil is placed in close contact with the core and mutual contact degree of the conductors is also increased. The lamination factor can therefore be enhanced.

Patent Document 4 discloses a technique related to assembled conductors. An adhesive layer is provided on an outer periphery of an insulation coating layer that insulates flat conductors. This can enhance the mutual contact degree of the flat conductor, resulting in an increase in lamination factor.

Patent Document 5 discloses a technique related to a rotary electric machine for a vehicle. Two flat conductors are insulated together in pairs, so that an insulation layer between the paired flat conductors can be made thin. Further, the outer periphery of the paired two flat conductors is formed in a curved shape. Inner four corners of each slot are formed in circular arc shape and the shape of the flat conductor is correspondingly designed. This can contribute to an increase in lamination factor.

Patent Document 6 discloses a technique related to a stator and a method for producing the same. Of conductors placed in a stator core, a conductor disposed on a near side to a teeth part is designed to have a circular cross section. This conductor is wound around the stator core and applied with pressure from outside after a first layer is formed. Thus, the contact degree of conductor parts is enhanced. Thereafter, another conductor having a rectangular cross section is wound as a second layer on a side far from the teeth part, thereby providing a double-layer structure. This can reduce a dead space and contribute to an increase in lamination factor of a stator.

RELATED ART DOCUMENTS

Patent Documents

Patent Document 1: JP-A-2003-018779
Patent Document 2: JP-A-2005-204422
Patent Document 3: JP-A-2007-135326
Patent Document 4: JP-A-2007-227241
Patent Document 5: JP-A-2008-043026
Patent Document 6: JP-A-2008-278681

SUMMARY OF INVENTION

Problems to be Solved by the Invention

However, Patent Documents 1 to 6 may cause the following problems.

In the case where the shape of the flat conductor is partially changed as shown in Patent Documents 1 to 5, it is conceivable to need shape forming of coils using a press or the like after the coils are wound in Patent Document 1 or segment coils are formed in Patent Document 5. However, those coils have to be separately deformed after formed in respective shapes. The number of works is thus increased, leading to cost increase. Therefore, these techniques are not preferable.

Patent Documents 2 to 4, and 6 adopt the techniques that the coils are wound on the stator core and then pressed to conform to the shape of teeth parts of the stator core. Regarding shape-forming after coil winding, it conceivably needs much time and labor as in Patent Documents 1 and 5. In light of configuration, furthermore, the stator core may have to be a split type. However, a split-type stator core causes large iron loss (core loss) or the like. Thus, a method applicable to an integrated stator core is preferable.

In a case where a flat conductor is edgewise bent to form a coil, a bent portion of the flat conductor on an inner circumference side has to be clamped during edgewise bending. However, the techniques disclosed in Patent Documents 1 to 6 take no consideration in that regard. As a result of study, the applicant found that, for edgewise bending of a flat conductor, a shaft corresponding to an inner die which contacts with the bending inner circumference side and a flange are preferably integrated, a clamp shaft is provided in a base to be movable back and forth and the flat conductor is edgewise bent along the shaft while the flat conductor is clamped between the base and the clamp flange, so that the flat conductor is prevented from bulging or expanding on the inner circumference side. However, in the above case, a joint portion of the flange and the shaft has to be formed in a curved or rounded shape, not in a pin corner shape, to prevent fatigue breakage. As a result, the corners of a rectangular cross section of a flat conductor have to be chamfered with a radius equal to or larger than the curved corner of the joint portion of the shaft and the flange. It is found that this may deteriorate the lamination factor of the stator after the coil formed.

To solve the above problems, the present invention has a purpose to provide a stator, a method for manufacturing the stator, and a flat conductor for winding, capable of increasing a lamination factor of the stator without increasing the number of works.

Means of Solving the Problems

To achieve the above purpose, one aspect of the invention provides a stator configured as below.

(1) In a stator including a stator core having a plurality of slots and teeth parts, and coils each formed of a wound flat conductor and placed in the slots, the flat conductor has a rectangular cross section with corners including a first corner located on an inner circumference side of the coil when the flat conductor is wound in the coil, the first corner being formed with a round chamfer having a radius larger than the other corners, and when the coils are inserted in the slots of the stator core, the rectangular cross section of each coil is arranged so that the first corner faces toward an outer circumference side of the stator core.

(2) In the stator described in (1), preferably, the round chamfer of the first corner is formed with a larger radius than a corner round-chamfer provided in a joint portion joining a clamp flange and a guide shaft, the clamp flange being configured to clamp the flat conductor in a thickness direction when the flat conductor is edgewise bent, and the guide shaft being configured to contact with an inner circumference portion of the flat conductor during bending.

(3) In the stator described in (1) or (2), preferably, the rectangular cross section includes a second corner located opposite on a diagonal to the first corner, the second corner being formed as with the first corner with a round chamfer having a larger radius than a radius of the other corners.

Furthermore, to achieve the above purpose, another aspect of the invention provide a method for manufacturing a stator configured as below.

(4) In a method for manufacturing a stator by edgewise bending a flat conductor to form a coil and placing the coil in a stator core, the method includes: edgewise bending the flat conductor to form the coil while clamping the flat conductor by use of a clamp mechanism integrally including a clamp plate for pressing the flat conductor and a guide shaft configured to contact with an inner circumference side of the flat conductor to be edgewise bent, the flat conductor having a rectangular cross section with corners including a first corner formed with a round chamfer having a radius larger than a radius of other corners and equal to or larger than a radius of a corner round-chamfer formed in a joint portion joining the clamp plate and the guide shaft, so that the joint portion and the first corner contact with each other; and placing the coil in the stator core so that the first corner of the rectangular cross section of the coil faces to an outer circumference side of the stator core to produce the stator.

(5) In the method for manufacturing a stator described in (4), preferably, the rectangular cross section of the flat conductor includes a second corner located opposite on a diagonal to the first corner, the second corner being formed as with the first corner with a round chamfer having a larger radius than a radius of the other corners.

To achieve the above purpose, another aspect of the invention provides a flat conductor for winding configured as below.

(6) In a flat conductor for winding to be wound and used as a coil, a rectangular cross section has corners including a first corner located on an inner circumference side of the coil when the flat conductor is wound in the coil, the first corner being formed with a round chamfer having a larger radius than a radius of other corners, and the rectangular cross section includes a second corner located opposite on a diagonal to the first corner, the second corner being formed as with the first corner with a round chamfer having a larger radius than a radius of the other corners.

Effects of the Invention

The above aspect of the stator can provide the following operations and effects.

(1) According to the above configuration (1), in a stator including a stator core having a plurality of slots and teeth parts, and coils each formed of a wound flat conductor and placed in the slots, the flat conductor has a rectangular cross section with corners including a first corner located on an inner circumference side of the coil when the flat conductor is wound in the coil, the first corner being formed with a round chamfer having a radius larger than the other corners, and when the coils are inserted in the slots of the stator core, the rectangular cross section of each coil is arranged so that the first corner faces toward an outer circumference side of the stator core.

When the flat conductor is to be wound in a coil form, the radius of the round chamfer of the first corner of the rectangular cross section of the flat conductor is set to be larger than the other corners. The stator is configured so that the first corner of this coil contacts with the root portion of the teeth part. This can enhance the lamination factor of the stator. The teeth part provided to protrude on the inner circumference side of the stator core has such a shape in structure as to become narrow on a distal end side than a root of the teeth part. There is also a case where the distal end of the teeth part is widened as shown in Patent Document 1 according to design specification. However, this also totally exhibits the same tendency. Accordingly, the root portion of the teeth part has an obtuse angle. In correspondence thereto, the first corner of the flat conductor is formed with the round chamfer having the large radius. This can obtain an effect that dead space is reduced. Thus, it can be expected to increase the lamination factor of the stator.

The above configuration (2) provides, in the stator described in (1), the round chamfer of the first corner is formed with a larger radius than a corner round-chamfer provided in a joint portion joining a clamp flange and a guide shaft, the clamp flange being configured to clamp the flat conductor in a thickness direction when the flat conductor is edgewise bent, and the guide shaft being configured to contact with an inner circumference portion of the flat conductor during bending. The corner round-chamfer (Corner radius)

formed in the connecting portion connecting the guide shaft and the flange mentioned in the Problems to be solved by the invention is formed to mitigate stress concentration. The radius of the round chamfer of the first corner is set large correspondingly. This can prevent interference of the flat conductor with the joint portion joining the clamp flange and the guide shaft during edgewise bending of the flat conductor. In addition, other corners than the first corner are designed with a smaller radius than the radius of the round chamfer of the first corner, so that a decrease in lamination factor can be reduced to the minimum.

The above configuration (3) provides, in the stator described in (1) or (2), the rectangular cross section includes a second corner located opposite on a diagonal to the first corner, the second corner being formed as with the first corner with a round chamfer having a larger radius than a radius of the other corners. Since the first corner and the second corner of the rectangular cross section of the flat conductor are located opposite on the diagonal and each formed with the round chamfer having a larger radius other than the corners, edgewise bending is enabled without taking care of the orientation of the flat conductor. Therefore, the productivity of coils can be increased and the productivity of stators can be expected to increase.

The above aspect of the method for manufacturing a stator can provide the following operations and effects.

The above configuration (4) provides a method for manufacturing a stator by edgewise bending a flat conductor to form a coil and placing the coil in a stator core, wherein the method includes: edgewise bending the flat conductor to form the coil while clamping the flat conductor by use of a clamp mechanism integrally including a clamp plate for pressing the flat conductor and a guide shaft configured to contact with an inner circumference side of the flat conductor to be edgewise bent, the flat conductor having a rectangular cross section with corners including a first corner formed with a round chamfer having a larger radius than a radius of other corners and equal to or larger than a radius of a corner round-chamfer formed in a joint portion joining the clamp plate and the guide shaft, so that the joint portion and the first corner contact with each other; and placing the coil in the stator core so that the first corner of the rectangular cross section of the coil faces to an outer circumference side of the stator core to produce the stator.

The joint portion joining the clamp plate and the guide shaft is provided with a corner round-chamfer to avoid stress concentration. The first corner of the rectangular cross section of the flat conductor corresponding to this corner round-chamfer of the joint portion is formed with a round chamfer. The radius of the round chamfer formed in the first corner is set to be larger than the radius of the corner round-chamfer of the joint portion. This can prevent the joint portion and the first corner from interfering with each other during edgewise bending of the flat conductor, and thus prevent deformation of the flat conductor due to the interference. As a result, a predetermined shape can be obtained, which can contribute to enhancement of the lamination factor of the stator. Furthermore, it can be expected to reduce dead space according to the shape of the teeth part as described in (1), so that further improvement of the lamination factor can be expected.

The above configuration (5) provides, in the method for manufacturing a stator described in (4), the rectangular cross section of the flat conductor includes a second corner located opposite on a diagonal to the first corner, the second corner being formed as with the first corner with a round chamfer having a larger radius than a radius of the other corners. Since the first corner and the second corner of the rectangular cross section of the flat conductor are located opposite on the diagonal and each formed with the round chamfer having a larger radius than the other corners, the edgewise bending is enabled without taking care of the orientation of the flat conductor. Therefore, the productivity of coils can be increased and the productivity of stators can be expected to increase.

The above aspect of the flat conductor for winding can provide the following operations and effects.

The above configuration (6) provides a flat conductor for winding to be wound and used as a coil, wherein a rectangular cross section has corners including a first corner located on an inner circumference side of the coil when the flat conductor is wound in the coil, the first corner being formed with a round chamfer having a larger radius than a radius of other corners, and the rectangular cross section includes a second corner located opposite on a diagonal to the first corner, the second corner being formed as with the first corner with a round chamfer having a larger radius than a radius of the other corners. Since the first corner of the corners of the rectangular cross section of the flat conductor for winding is formed with the large round chamfer, it is possible to prevent the flat conductor from interfering with the corner round-chamfer formed in the joint portion joining the clamp plate and the guide shaft during edgewise bending, thus to assist winding of the flat conductor in a predetermined shaped coil. When the coils made of the flat conductors are assembled together to form the stator, the flat conductor can contribute to an increase in the lamination factor of the stator.

Since the first corner and the second corner present opposite on the diagonal to the first corner are each formed with the round chamfer having a large radius, it is possible to wind the flat conductor without taking care of interference between the coil to be wound and the corner round-chamfer formed in the joint portion joining the clamp plate and the guide shaft even if the front and back surfaces of the flat conductor are not managed. Accordingly, enhancement of the conductivity of coils can be expected.

MODE FOR CARRYING OUT THE INVENTION

A detailed description of a first embodiment of embodying the present invention will now be given referring to the accompanying drawings.

Figure 1:
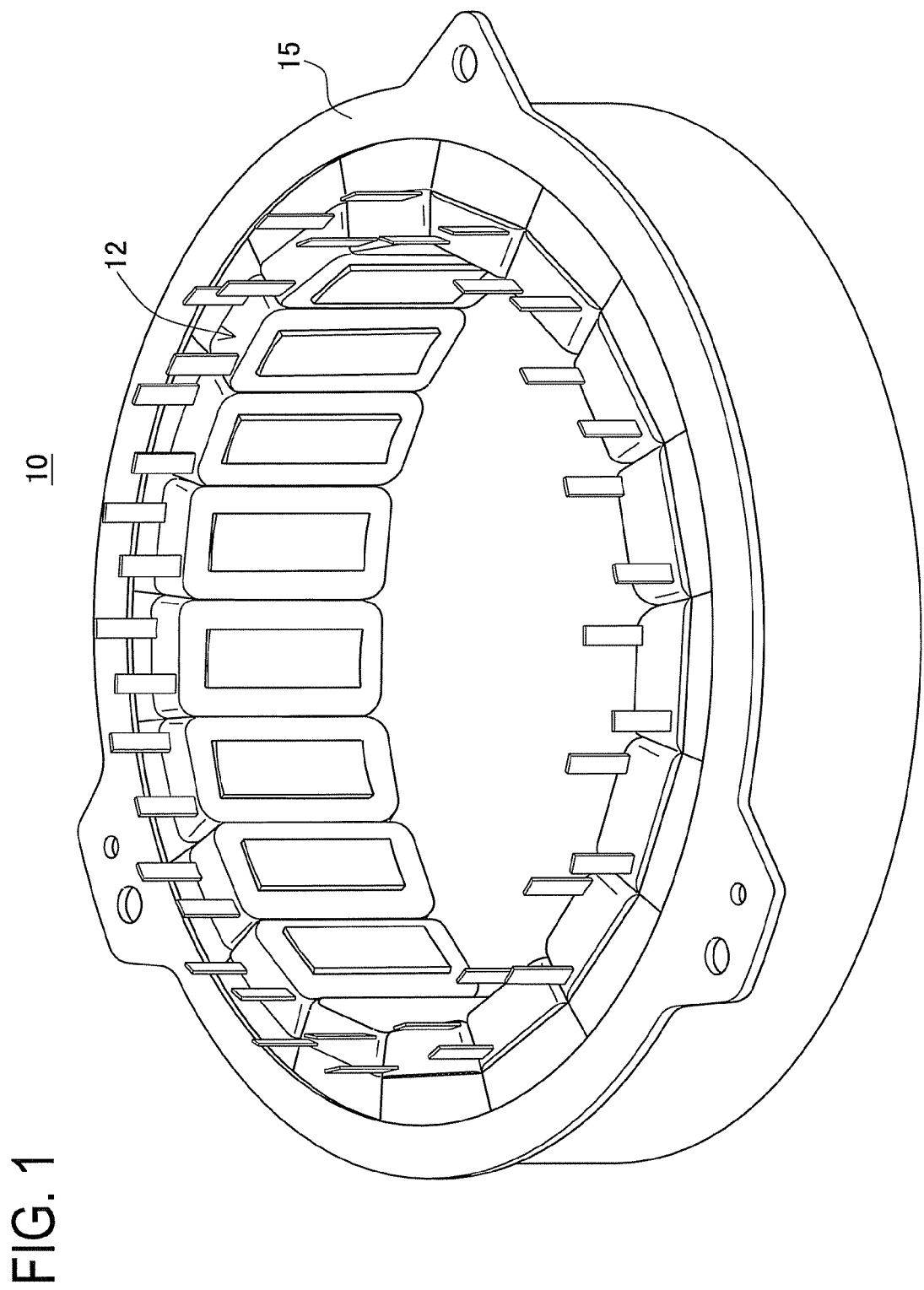
FIG. 1 is a perspective view of a stator in a first embodiment.
Figure 2:
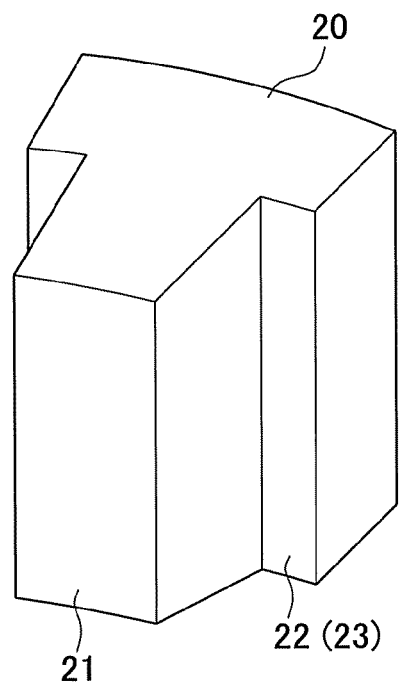
FIG. 2 is a perspective view of a stator core element of a split type stator in the first embodiment.
Figure 3:
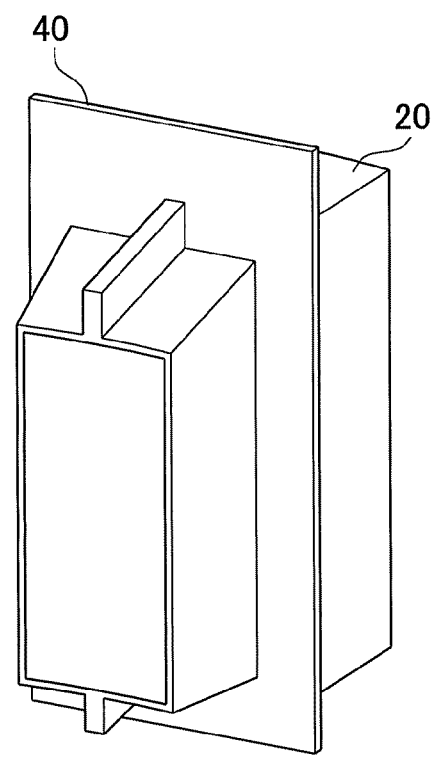
FIG. 3 is a perspective view showing a state in which an insulator is fitted on the stator core element in the first embodiment.
Figure 4:
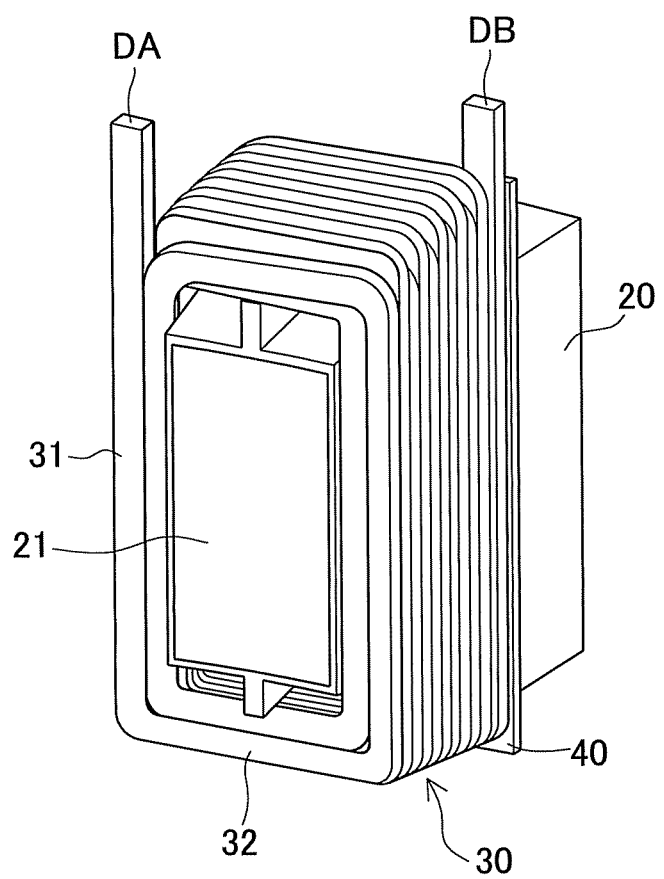
FIG. 4 is a perspective view showing a state in which a coil is mounted on the stator core element in the first embodiment.

FIG. 1 is a perspective view of a stator 10 in the first embodiment. FIG. 2 is a perspective view of a stator core element ("core element") 20 of a split type stator. FIG. 3 is a perspective view showing a state in which an insulator 40 is fitted on the core element 20. FIG. 4 is a perspective view showing a state in which a coil is mounted on the core element 20. The stator 10 in the first embodiment is configured so that stator units 12 each including the core element 20 and the coil 30 mounted thereon are arranged in a cylindrical form and then an outer ring 15 is fitted and retained on an outer periphery of the stator units 12.

Each core element 20 is formed of electromagnetic steel plates that are punched out by a press machine and then stacked in layers. Each core element 20 is provided with a teeth part 21 protruding on an inner circumference side. Slot bottoms 22 are formed on both sides of the teeth part 21. Each slot bottom 22 of the core element 20 cooperates with slot bottoms 22 of adjacent core elements 20 so that each pair of adjacent slot bottoms 22 form one slot 23. In other words, the core elements 20 are separated at the center of each slot 23. Side walls of each slot 23 are defined by the teeth parts 21.

Figure 5:
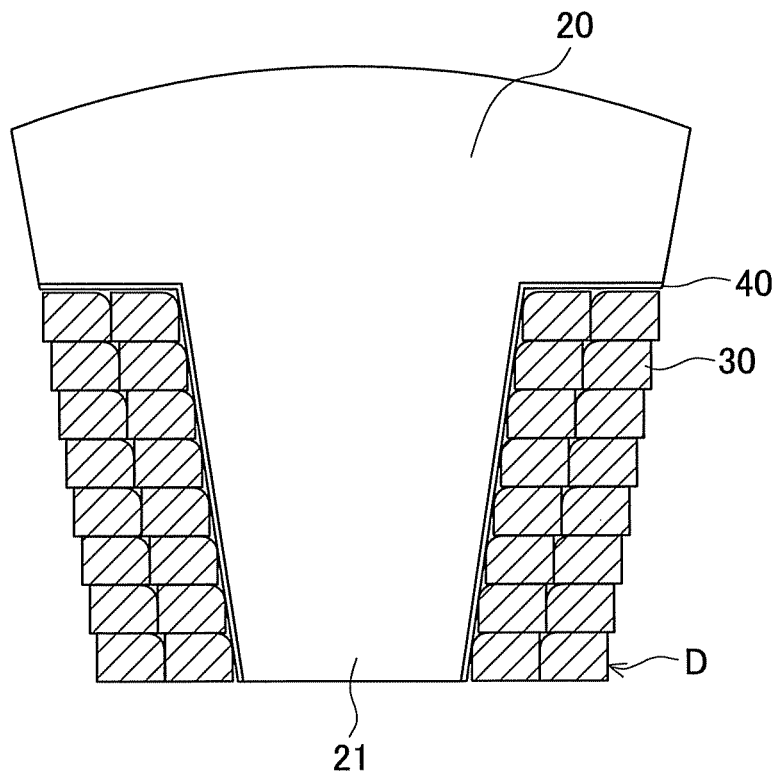
FIG. 5 is a partial cross sectional view of a stator in the first embodiment.
Figure 6:
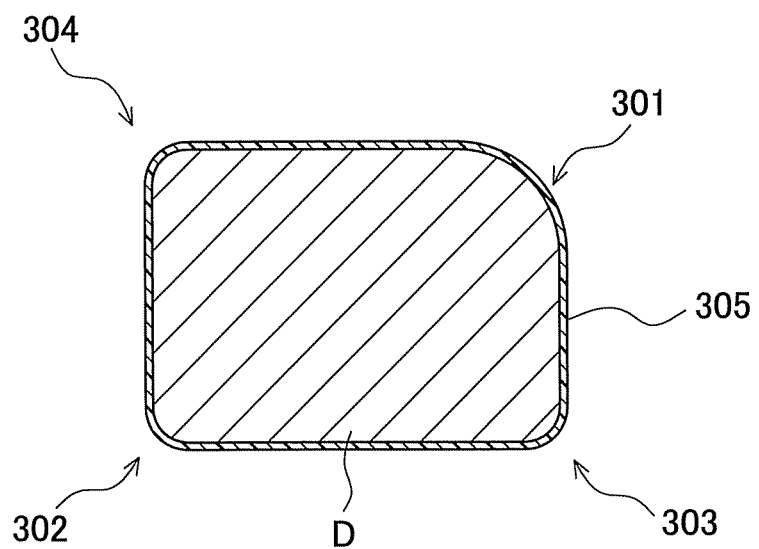
FIG. 6 is a cross sectional view of a flat conductor in the first embodiment.

Each coil 30 is formed of a flat conductor D wound by edgewise bending. Each coil 30 is wound doubly and set in the slots 23. To be concrete, as shown in FIG. 4, the coil 30 is inserted on the teeth part 21 over the insulator 40. FIG. 5 is a partial cross sectional view of the stator 10. FIG. 6 is a cross sectional view of the flat conductor D. As shown in FIG. 5, the flat conductor D is arranged by two parts in cross section in a circumferential direction of the stator 10 and eight parts in cross section in a radial direction. The flat conductor D is made of a high conductive metal such as copper and formed with a nearly rectangular cross section. An insulating coating layer 305 is provided on the periphery of the flat conductor D.

Assuming that corners (edges) of the cross section of the flat conductor D are referred to for convenience as a first corner 301, a second corner 302, a third corner 303, and a fourth corner 304, the first corner 301 is subjected to R-chamfering (Round chamfering) with a radius of an R-chamfer set to as large as about 0.8 as compared with other corners. The other corners, i.e., the second to fourth corners 302 to 304 are also subjected to R-chamfering but with a radius set to about 0.2 smaller than the first corner 301. This cross section is obtained by the shape of a die used in forming the flat conductor D by drawing process. Both ends of each coil 30 are formed as a first terminal portion DA and a second terminal portion DB as shown in FIG. 4 which are to be connected to first terminal portions DA and second terminal portions DB of other coils 30 and others via bus bars not illustrated.

The insulator 40 is formed, as shown in FIG. 3, in such a shape as to cover the outer periphery of the teeth part 21 and the slot bottoms 22. The insulator 40 is made of insulating resin and designed with a thickness capable of providing insulation between the core element 20 and the coil 30. The insulator 40 functions to release the heat generated from the coil 30 toward the core element 20. Thus, the insulator 40 is preferably able to ensure heat conductivity.

Figure 7:
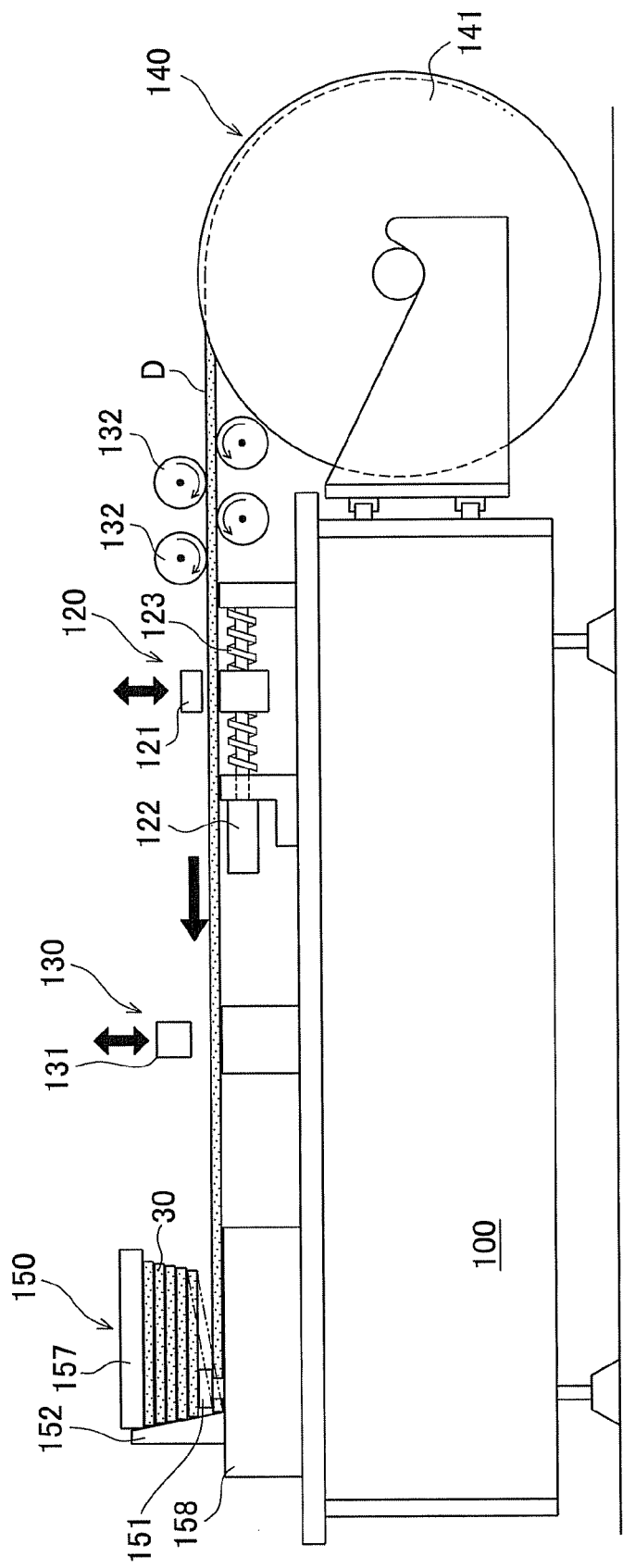
FIG. 7 is a schematic diagram of an apparatus for edgewise bending the flat conductor in the first embodiment.
Figure 8:
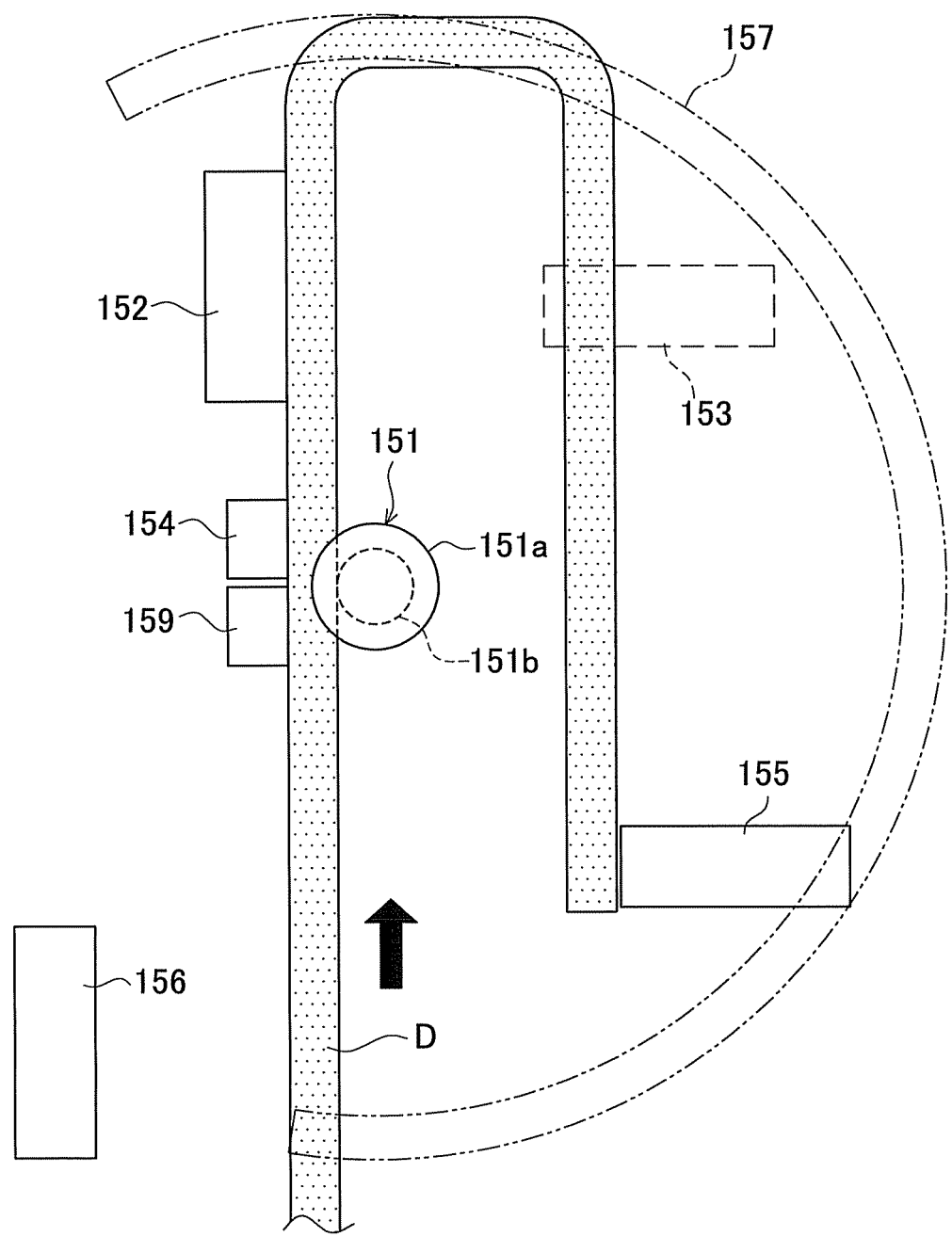
FIG. 8 is a plan view showing an edgewise bending work in the first embodiment.
Figure 9:
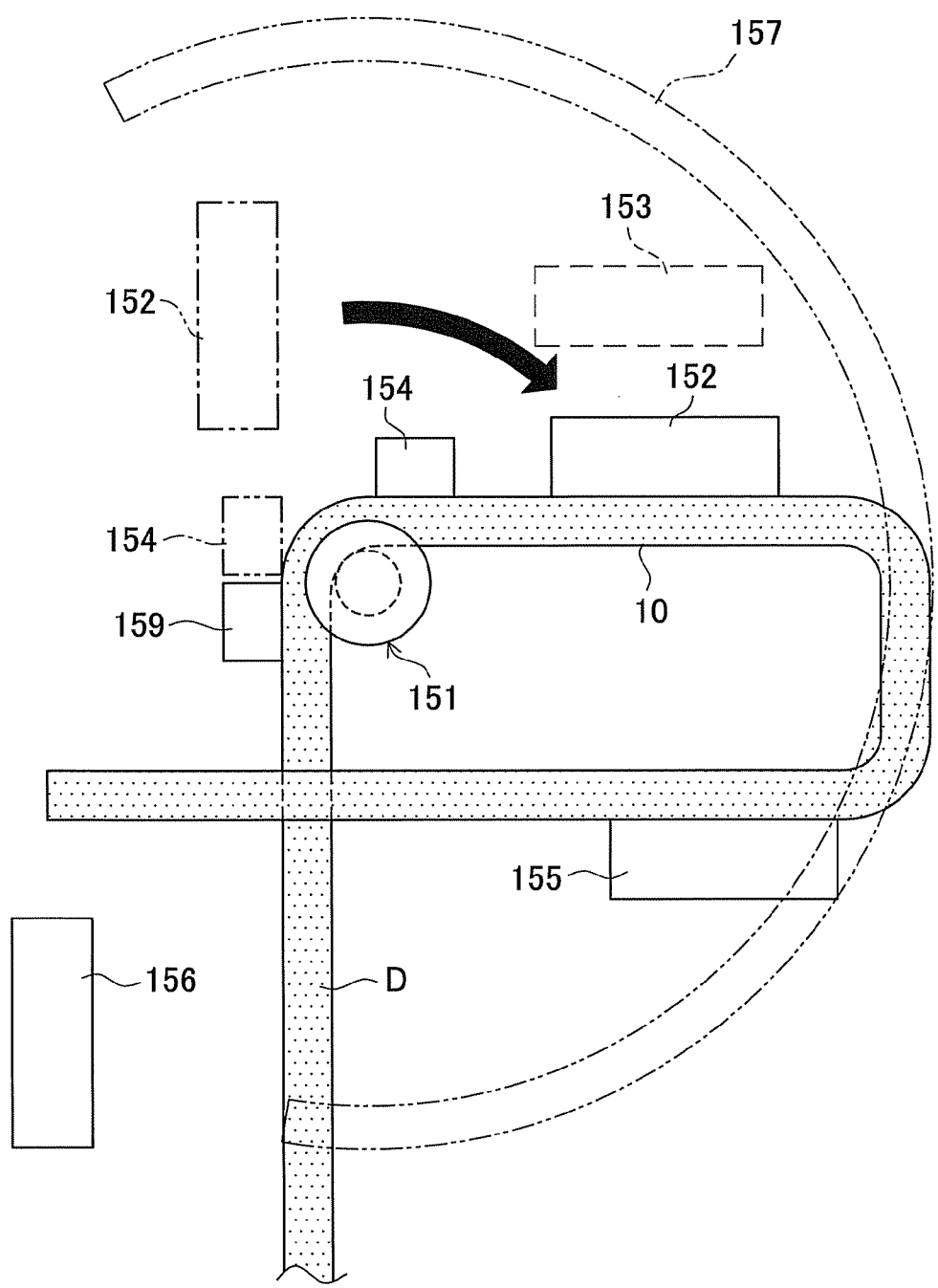
FIG. 9 is a plan view showing a step following FIG. 8 in the first embodiment.

Next, an edgewise bending process of the flat conductor D will be explained. FIG. 7 is a schematic diagram of an apparatus for edgewise bending the flat conductor. FIG. 8 is a plan view showing an edgewise bending work. FIG. 9 is a plan view showing a step following FIG. 8. An edgewise bending machine 100 includes a feeding mechanism 120, a conductor holding mechanism 130, a smoothing mechanism 132, an uncoiler 140, and a bending mechanism 150. The uncoiler 140 includes a rotatable bobbin 141. On the bobbin 141, the flat conductor D is wound in a flatwise direction.

The feeding mechanism 120 has the function of drawing the flat conductor D from the bobbin 141 and feeding the flat conductor D toward the bending mechanism 150. The coil 30 has long sides 31 and short sides 32 so that the long sides 31 and the short sides 32 are also different in length between on the inner circumference side and the outer circumference side of the coil 30. Thus, the feeding mechanism 120 can adjust a feeding amount according to the long side 31 and the short side 32. The conductor holding mechanism 130 has the function of clamping and holding the flat conductor D by use of a clamp 131. The smoothing mechanism 132 has the function of smoothing or straightening the flat conductor D drawn from the bobbin 141. The bending mechanism 150 has the function of edgewise bending the flat conductor D.

By use of the above edgewise bending machine 100, the flat conductor D is edgewise bent to form the coil 30. FIG. 8 illustrates the process of forming the long side 31 of the coil 30. After the flat conductor D is fed by a predetermined length by the feeding mechanism 120, a clamp flange 151 is moved down toward a work base 158 to clamp the flat conductor D in the thickness direction while pressing the flat conductor D against the work base 158. The clamp flange 151 is provided with a circular-plate-shaped flange part 151a and a cylindrical guide part 151b. The flat conductor D is clamped in the thickness direction by the flange part 151a and then edgewise bent as the guide shaft part 151b acting as a guide for the inner circumference side of the coil 30.

To be concrete, while a guide 159 supports the side of the flat conductor D, a first rotating jig 152 and a first bending jig 154 are rotated to form the long side 31 of the coil 30. As the flat conductor D is edgewise bent from the state of FIG. 8, the end face of the long side 31 of the coil 30 is guided by a first guide 155.

At that time, the upper surface of the coil 30 under winding is supported by an upper surface support 157. This support 157 is configured to move upward as winding of the coil 30 is advanced to appropriately restrain deformation of the coil 30. As the first rotating jig 152 and the second bending jig 154 are rotated as above, the flat conductor D is edgewise bent from the state of FIG. 8 to the state of FIG. 9. A second rotating jig 153 is used to form a next turn. The first rotating jig 152 and the second rotating jig 153 are alternately used to wind the coil 30. A second guide 156 guides the end face of the long side 31 during use of the second rotating jig 153. The flat conductor D is edgewise bent as above to form the coil 30 doubly wound as shown in FIG. 4.

The coil 30 is inserted on the teeth part 21 through the insulator 40 fitted on the core element 20 as explained above. Thereafter, resin molding is applied over the coil 30, even though it is not illustrated. Thus, the stator unit 12 is produced. The produced stator units 12 are arranged in a cylindrical form and then the outer ring 15 is fitted on the outer periphery of the stator units 12 by shrinkage fitting. Accordingly, the stator units 12 can be retained in the cylindrical form by the outer ring 15. The first terminal portions DA and the second terminal portions DB are connected via the bus bars, even though it is not illustrated. The stator 10 is thus completed.

The stator 10 in the first embodiment is configured as above can provide the following operations and effects explained below.

The above configured stator 10 in the first embodiment can achieve an effect that the lamination factor of the stator 10 is increased. The stator 10 in the first embodiment includes the stator units 12 having a plurality of slots 23 and teeth parts 21, and the coils 30 each formed of the wound flat conductor D placed in the slots 23. Of the corners of a rectangular cross section of the flat conductor D, the first corner 301 located on the inner circumference side of the coil 30 when the flat conductor D is wound in the coil 30 is formed with a round chamfer with a larger radius than remaining corners. When the coil 30 is inserted in the slots 23 of the core elements 20, the first corner 301 of the coil 30 is disposed to face to the outer circumference side of the core element 20.

Figure 10:
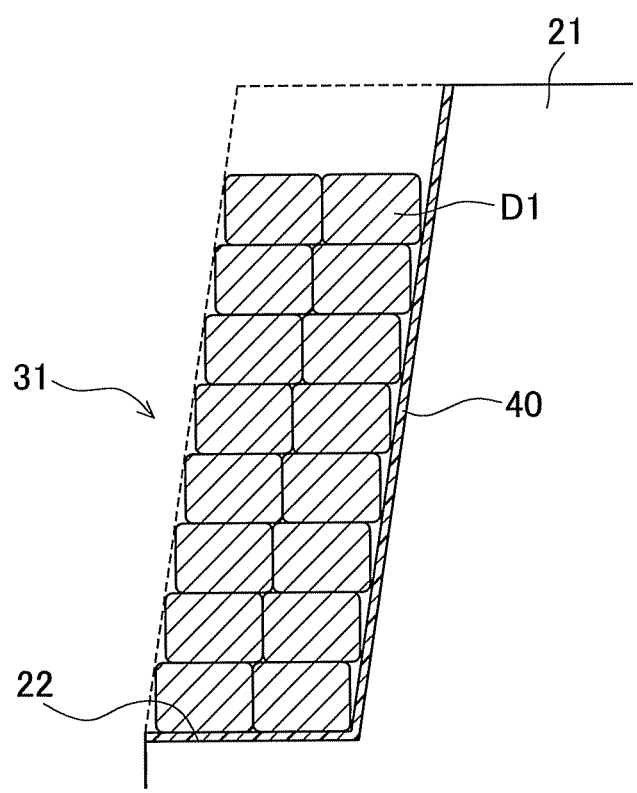
FIG. 10 is a conceptual diagram related to a lamination factor in the case of using a flat conductor prepared for comparison.
Figure 11:
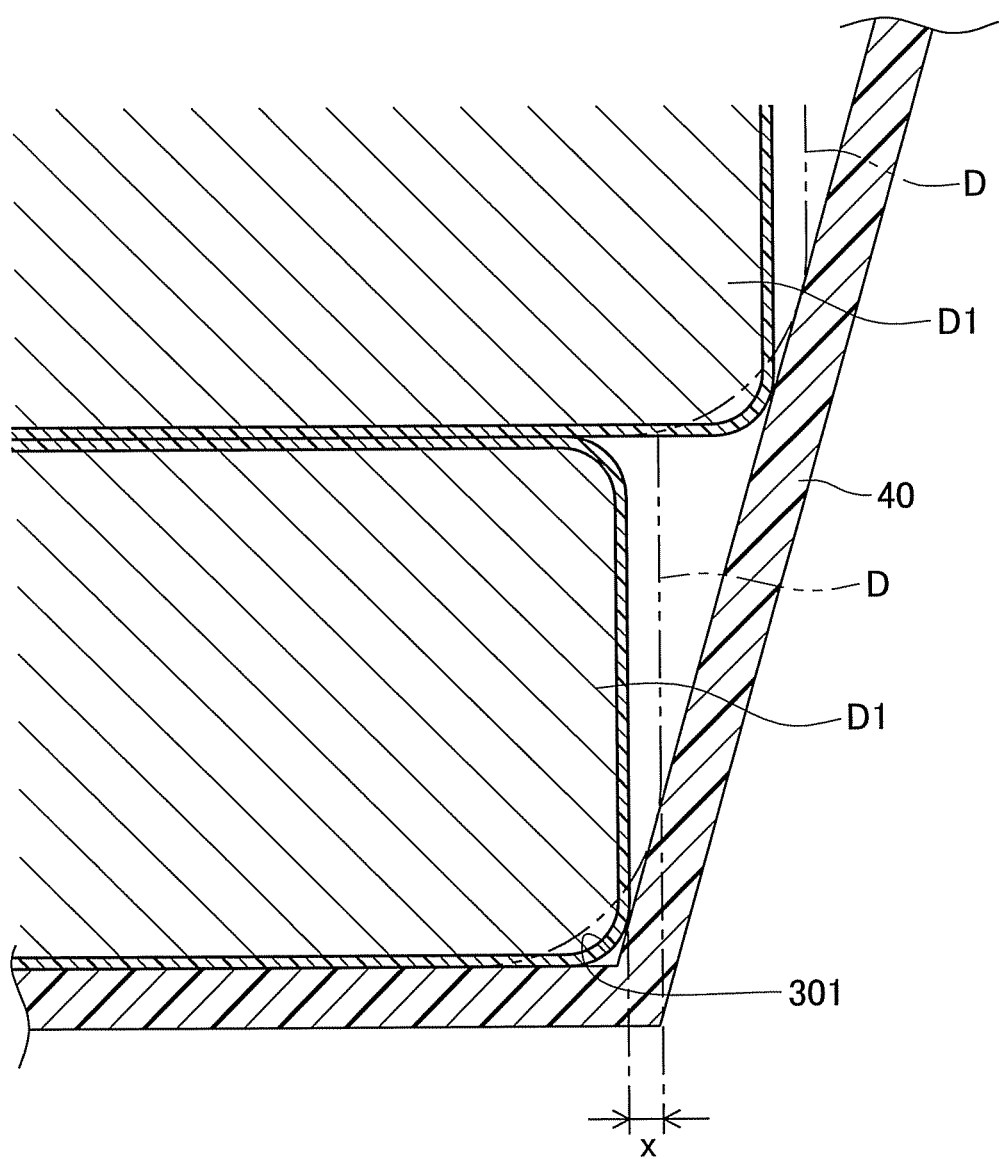
FIG. 11 is a conceptual explanation view showing comparison with the case of using a flat conductor in the first embodiment.

FIG. 10 is a conceptual diagram related to a lamination factor in the case of using a flat conductor D1 prepared for comparison. FIG. 11 is a conceptual explanation view showing comparison with the case of using the flat conductor D of the first embodiment. The flat conductor D1 shown in FIG. 10 has a rectangular cross section having four corners being all round-chamfered with a radius of R0.3, differently from that in the first embodiment. On the other hand, if the flat conductor D of the first embodiment is replaced with that of FIG. 10, each first corner 301 is located to the teeth part 21 side as shown in FIG. 11. Thus, the flat conductor D can be placed close to the teeth part 21 by a size X.

Accordingly, the first corner 301 formed with a large R-chamfer is placed to face to the root side of the teeth part 21, that is, to the outer circumference side of the stator 10, and the first corner 301 is placed on the inner circumference side of the coil 30 as shown in FIG. 5. Thus, the cross sectional area of the flat conductor D can be increased by the size X in the width direction. However, a part of the cross sectional area is decreased by formation of the first corner 301, but the lamination factor can be expected to be increased by about 1% even by counterbalancing the decrease. The lamination factor is substantially expected to increase by about several percent for the reason mentioned later.

Another effect is that the formation of the first corner 301 in the flat conductor D can prevent interference with the edgewise bending machine 100. The R-chamfer of the first corner 301 is formed with a larger radius than a corner round-chamfer (corner radius) provided in a joint portion 151c joining the clamp flange 151 which clamps the flat conductor D in the thickness direction during edgewise bending of the flat conductor D and the guide shaft 151b which contacts with the inner circumferential portion of the flat conductor D.

Figure 12:
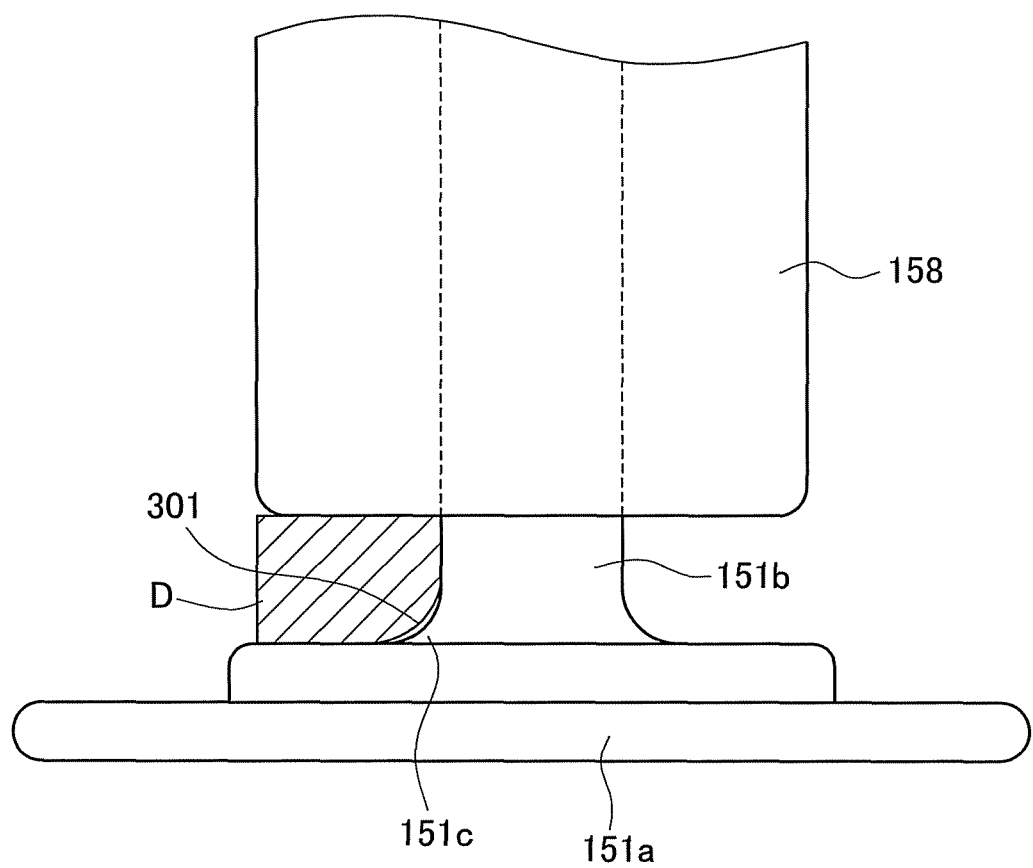
FIG. 12 is a side view showing the flat conductor is clamped with a clamp flange in the first embodiment.

FIG. 12 is a side view showing a state in which the flat conductor is clamped by the clamp flange 151. The joint portion 151c formed in the guide shaft 151b with respect to the flange part 151a explained in the Problems to be solved by the invention is provided with a corner radius to mitigate stress concentration. It is found by the stress analysis made by the applicant that stress is most concentrated on around the areas above and below the joint portion 151c when the flat conductor D is clamped. By the corner rounding or the chamfering, this stress concentration can be reduced. In the first embodiment, the corner radius of about R0.7 is provided in consideration of the analysis result.

Clamping the flat conductor D with the clamp flange 151 is intended to deal with the known tendency that the thickness of the inner circumference side of the coil 30, i.e., a portion to be clamped by the flange part 151a, is increased during edgewise bending of the flat conductor D, and the thickness of the outer circumference side of the coil 30 is decreased. An increased thickness is not preferable because it leads to a decrease in lamination factor. Therefore, the clamp flange 151 applies a force to the flat conductor D with about hundreds MPa to maintain a predetermined interval in the thickness of the flat conductor D.

In this clamp flange 151, the joint portion 151c joining the flange part 151a and the guide shaft part 151b has a corner radius of about R0.7 as mentioned above. Correspondingly, the radius of the R-chamfer of the first corner 301 is set to as large as about R0.8. This configuration can prevent interference between the flat conductor D and the joint portion 151c provided between the flange part 151a and the guide shaft part 151b during edgewise bending of the flat conductor D. In addition, the remaining corners other than the first corner 301 are designed with a radius smaller than the radius of the R-chamfer of the first corner 301, so that a decrease in lamination factor can be reduced to the minimum.

It is further necessary to design the first corner 301 and the joint portion 151c so as not to interfere with each other. In case the first corner 301 and the joint portion 151c interfere, the cross sectional shape of the flat conductor D may be deformed when the flat conductor D is edgewise bent. This deformation may deteriorate the lamination factor. Thus, the first corner 301 and the joint portion 151c are prevented from interfering. Due to the above restriction, the corners of the flat conductor D are generally designed in accordance with the radius of the R-chamfer of the first corner 301 corresponding to the joint portion 151c. However, in the first embodiment, only the first corner 301 is set to R0.8, while the second corner 302 to the fourth corner 304 are set to R0.3, so that the lamination factor of the stator 10 can be increased.

A second embodiment of the invention will be explained below. A stator 10 of the second embodiment is almost identical in structure to the stator 10 of the first embodiment, excepting the shape of a flat conductor. The following explanation is made on differences from the first embodiment.

Figure 13:
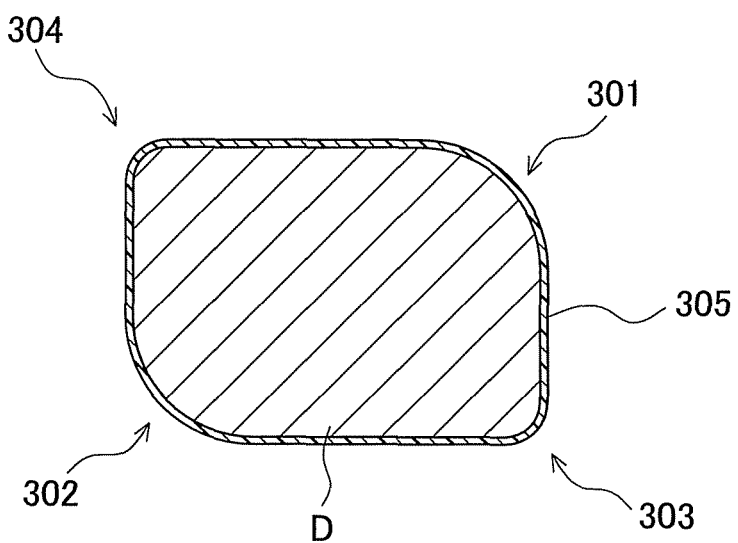
FIG. 13 is a cross sectional view of a flat conductor in a second embodiment.

FIG. 13 is a cross sectional view of a flat conductor D of the second embodiment. This flat conductor D is designed so that the first corner 301 and the second corner 302 are formed with R-chamfers having the same radius of R0.8. On the other hand, the third corner 303 and the fourth corner 304 are formed with an R-chamfer having a radius of R0.3. The first corner 301 and the second corner 302 are located opposite on the diagonal, while the third corner 303 and the fourth corner 304 are located opposite on the diagonal.

The stator 10 of the second embodiment configured as above can provide the following operations and effects.

The flat conductor D used in the second embodiment is configured so that the second corner 302 of the rectangular cross section, present opposite the first corner 301, is also formed with an R-chamfer having a larger radius as with the first corner 301 than the other corners. Consequently, even when front and back faces of the flat conductor D are reversed, the second corner 302 does not interfere with the joint portion 151c. Accordingly, it is not necessary to manage the front and back faces of the flat conductor D in forming the coil 30 and thus the yield improvement can be expected. It is to be expected that this yield improvement contributes to cost reduction.

The flat conductor D of the first embodiment shown in FIG. 11 can be placed so that the part (layer) disposed on the inner circumference side of the coil 30 is close to the teeth part 21 side by the size X. In contrast, the flat conductor D of the second embodiment is subjected to R-chamfering so that the second corner 302 also has a radius of R0.8 as well as the first corner 301. Accordingly, the flat conductor D placed on the outer circumference side of the coil 30 can be disposed to a direction apart from the teeth part 21. Consequently, even if it is counterbalanced by the decreased amount of the cross sectional area caused by the R-chamfering, the total cross sectional area can be increased. This can enhance the lamination factor of the stator 10.

The present invention is explained along the above embodiments but is not limited thereto. The invention may be embodied in other specific forms without departing from the essential characteristics thereof.

For instance, the first and second embodiments use the concentrated winding coils made of the flat conductor D, but are not limited thereto. A wave winding coil and a concentrically wound coil may also be adopted. Further, the above explanation is given to a cassette coil type that insulators and coils are inserted in advance on core elements of a split stator and then this assembly is covered by resin molding. As an alternative, the invention is applicable to a coil type that coils are inserted in an integrated type stator core.

The configuration of the edgewise bending machine 100 used in the first and second embodiments is a mere example and may also be modified within a range that the essential configuration of the clamp flange 151 and its surrounding related to the invention are not changed.

In the first and second embodiments, the lamination factor is calculated, which corresponds to a case where the lamination factor is expected to increase in the embodiments. The effects depend on the shapes of teeth part 21 and slot 23 or the number of turns of coil 30. Further, the radius of the R-chamfer is set to R0.8 and R0.3, but may be appropriately changed in correspondence with the joint portion 151c. Round chamfering of the flat conductor D is exemplified by R-chamfering. There is a possibility that the lamination factor can be expected by optimization of the shape of the round portion. Thus, a C-chamfering (Corner chamfering) and similar chamferings may be adopted.

REFERENCE SIGNS LIST

10 Stator
12 Stator unit
15 Outer ring
20 Stator core element
21 Teeth part
23 Slot
30 Coil
40 Insulator
100 Edgewise bending machine
120 Feeding mechanism
130 Conductor holding mechanism
140 Uncoiler
150 Bending mechanism
151 Clamp flange
151a Flange part
151b Shaft part
151c Joint portion
301 First corner
302 Second corner
303 Third corner
304 Fourth corner
305 Coating layer
D Flat rectangular conductor
D1 Flat rectangular conductor

The invention claimed is:

1. A stator including a stator core having a plurality of slots and teeth parts, and coils each formed of a wound flat conductor and placed in the slots, wherein the flat conductor has a rectangular cross section with corners including a first corner located on an inner circumference side of the coil when the flat conductor is wound in the coil, the first corner being formed with a round chamfer having a radius larger than the other corners, and when the coils are inserted in the slots of the stator core, the rectangular cross section of each coil is arranged so that the first corner faces toward an outer circumference side of the stator core.

2. The stator according to claim 1, wherein the round chamfer of the first corner is formed with a larger radius than a corner round-chamfer provided in a joint portion joining a clamp flange and a guide shaft, the clamp flange being configured to clamp the flat conductor in a thickness direction when the flat conductor is edgewise bent, and the guide shaft being configured to contact with an inner circumference portion of the flat conductor during bending.

3. The stator according to claim 2, wherein the rectangular cross section includes a second corner located opposite on a diagonal to the first corner, the second corner being formed as with the first corner with a round chamfer having a larger radius than a radius of the other corners.

4. The stator according to claim 1, wherein the rectangular cross section includes a second corner located opposite on a diagonal to the first corner, the second corner being formed as with the first corner with a round chamfer having a larger radius than a radius of the other corners.

5. A method for manufacturing a stator by edgewise bending a flat conductor to form a coil and placing the coil in a stator core, wherein the method includes:

edgewise bending the flat conductor to form the coil while clamping the flat conductor by use of a clamp mechanism integrally including a clamp plate for pressing the flat conductor and a guide shaft configured to contact with an inner circumference side of the flat conductor to be edgewise bent, the flat conductor having a rectangular cross section with corners including a first corner formed with a round chamfer having a larger radius than a radius of other corners and equal to or larger than a radius of a corner round-chamfer formed in a joint portion joining the clamp plate and the guide shaft, so that the joint portion and the first corner contact with each other; and placing the coil in the stator core so that the first corner of the rectangular cross section of the coil faces to an outer circumference side of the stator core to produce the stator.

6. The method for manufacturing a stator according to claim 5, wherein the rectangular cross section of the flat conductor includes a second corner located opposite on a diagonal to the first corner, the second corner being formed as with the first corner with a round chamfer having a larger radius than a radius of the other corners.

7. A flat conductor for winding to be wound and used as a coil, wherein a rectangular cross section has corners including a first corner located on an inner circumference side of the coil when the flat conductor is wound in the coil, the first corner being formed with a round chamfer having a larger radius than a radius of other corners, and the rectangular cross section includes a second corner located opposite on a diagonal to the first corner, the second corner being formed as with the first corner with a round chamfer having a larger radius than a radius of the other corners.

* * * * *